United States Patent [19]

Hong

[11] Patent Number: 5,249,084
[45] Date of Patent: Sep. 28, 1993

[54] METHOD AND APPARATUS FOR DUBBING A RECORDED VIDEO TAPE IN SYNCHRONISM WITH THE PLAYING OF THE VIDEO TAPE

[75] Inventor: Kwon-Pyo Hong, Suwon, Rep. of Korea

[73] Assignee: SamSung Electronics Co., Ltd., Suwon, Rep. of Korea

[21] Appl. No.: 783,828

[22] Filed: Oct. 29, 1991

[30] Foreign Application Priority Data

Dec. 11, 1990 [KR] Rep. of Korea .......................... 20337

[51] Int. Cl.$^5$ ............................................... G11B 5/86
[52] U.S. Cl. .................................................... 360/15
[58] Field of Search ....................... 360/13, 15, 69, 79; 358/311

[56] References Cited

U.S. PATENT DOCUMENTS 5,057,934 10/1991 Yun et al. ................................ 360/15
5,097,461 3/1992 Majima .................................... 360/15

FOREIGN PATENT DOCUMENTS 12396 10/1990 Japan .

Primary Examiner—John Shepperd
Assistant Examiner—Chris Kim
Attorney, Agent, or Firm—Robert E. Bushnell

[57] ABSTRACT

A method and apparatus is used for dubbing a recorded video tape simultaneously with the playing back of the recorded video tape from the initiation of the playback. The apparatus includes a synchronous record switch means for generating a synchronous record signal to enable the video tape recorder to dub the video tape in synchronism with the playing back, control means for generating first and second control signals, the first control signal driving a deck in record mode to load an empty video tape and thereafter to pause the video tape recorder when a record signal is inputted together with the synchronous record signal, the second control signal driving the deck in playback mode to load a recorded video tape and thereafter causing the video tape recorder to be in pause mode when a playback signal is inputted together with the synchronous record signal, pilot signal generating means for generating a pilot signal of a pilot signal frequency in response to the first or second control signals, a signal mixer for mixing the pilot signal and an audio signal generated from the recorded video tape being played back, pilot signal detection means for detecting the pilot signal from the mixed signal, an integrating circuit for integrating the pilot signal, and a comparator for comparing the integrated signal of the integrating circuit with a reference signal to detect the pilot signal to release the video tape recorder from the pause mode.

15 Claims, 5 Drawing Sheets

METHOD AND APPARATUS FOR DUBBING A RECORDED VIDEO TAPE IN SYNCHRONISM WITH THE PLAYING OF THE VIDEO TAPE

BACKGROUND OF THE INVENTION

The present invention relates to a video tape recorder, and more particularly to a method and apparatus for copying a program recorded on a video tape by using two video tape recorders.

Generally, a double deck audio cassette tape recorder has a record/playback deck together with an exclusive playback deck. A recorded cassette tape is loaded in the exclusive playback deck and the pause and playback buttons are pressed, whereas an empty cassette tape is loaded in the record/playback deck and the record button is pressed. Then the record/playback deck is operated in a record mode, while the exclusive playback deck is changed from a pause mode to a playback mode, so that the dubbing operation is performed.

However, a video tape recorder occupies too large a volume to be provided with two decks. Accordingly a recorded video tape is dubbed by using two video tape recorders, thus making it complicated to perform a precise dubbing. For example, one video tape recorder is operated in the playback mode, and the other in the record mode by hand selection of a user. In this case, if the playback mode of one video tape recorder starts prior to the record mode of the other video tape recorder, the beginning of the video tape is partially not dubbed.

SUMMARY OF THE INVENTION

The object of the present invention is to provide an apparatus and method for dubbing a recorded video tape simultaneously with the complete playback of the recorded video tape by using two video tape recorders.

According to one aspect of the present invention, a video tape recorder includes mode selection means for generating a plurality of key signals to perform various functions including record and playback functions, and deck means for playing back and recording a video tape in response to the key signals. An apparatus for dubbing a recorded video tape simultaneously with playing back the recorded video tape includes: (a) synchronous record switch means for generating a synchronous record signal to enable the video tape recorder to dub the recorded video tape in synchronism to an empty video tape; (b) control means for generating first and second control signals, the first control signal driving deck means in record mode to load the empty video tape and thereafter to pause the video tape recorder when a record key signal is supplied together with the synchronous record signal, the second control signal driving the deck means in playback mode to load the recorded video tape and thereafter to provide the video tape recorder in still mode when a playback key signal is inputted together with the synchronous record signal; (c) pilot signal generating means for generating a pilot signal at a pilot signal frequency in response to one of the first and second control signals; (d) an adder for combining the pilot signal and an audio signal generated from the recorded video tape being played back; (e) pilot signal detection means for detecting the pilot signal from the output signal of the adder; (f) an integrating circuit for generating an integrated signal by integrating the pilot signal; and (g) a comparator for comparing the integrated signal of the integrating circuit with a reference signal to detect the pilot signal to release the video tape recorder from the pause mode.

According to another aspect of the present invention, a method for dubbing a recorded video tape simultaneously with the playing back of the recorded video tape uses first and second video tape recorders each having mode selection key means for generating a plurality of key signals to perform various functions including record and playback functions, and a deck means for playing back and recording a video tape in response to the key signals, the method comprising the steps of: (a) operating the first video tape recorder in pause mode after loading the recorded video tape when the first video tape recorder receives a playback signal together with a synchronous record signal; (b) operating the second video tape recorder in pause mode after loading an empty video tape when the second video tape recorder receives a record signal together with the synchronous record signal; (c) providing a first pilot signal of a pilot signal frequency for indicating the second video tape recorder being prepared to perform the record mode to the first video tape recorder; (d) changing the first video tape recorder from the pause mode into the playback mode in response to the first pilot signal received from the second video tape recorder; (e) detecting a second pilot signal in the second VTR, from a mixed signal generated in the first VTR of an audio signal and the second pilot signal; and (f) changing the second video tape recorder from the pause mode to the record mode in response to the second pilot signal, whereby a moment of starting the playback mode of the first video tape recorder is simultaneous with a moment of starting the record mode of the second video tape recorder.

The pilot signals preferably have an inaudible frequency in order to prevent interference with the played back signal. The pilot signals are transmitted through audio line input/output terminals of the first and second video tape recorders. The audio line output terminal of the first video tape recorder is connected to the audio line input terminal of the second video tape recorder, and the audio line input terminal of the first video tape recorder is connected to the audio line output terminal of the second video tape recorder.

BRIEF DESCRIPTION OF THE ATTACHED DRAWINGS

For a better understanding of the invention and to show how the same may be carried into effect, reference will now be made by way of example to the accompanying drawings, in which.

DETAILED DESCRIPTION OF THE PREFERRED EMBODIMENTS

Figure 1:
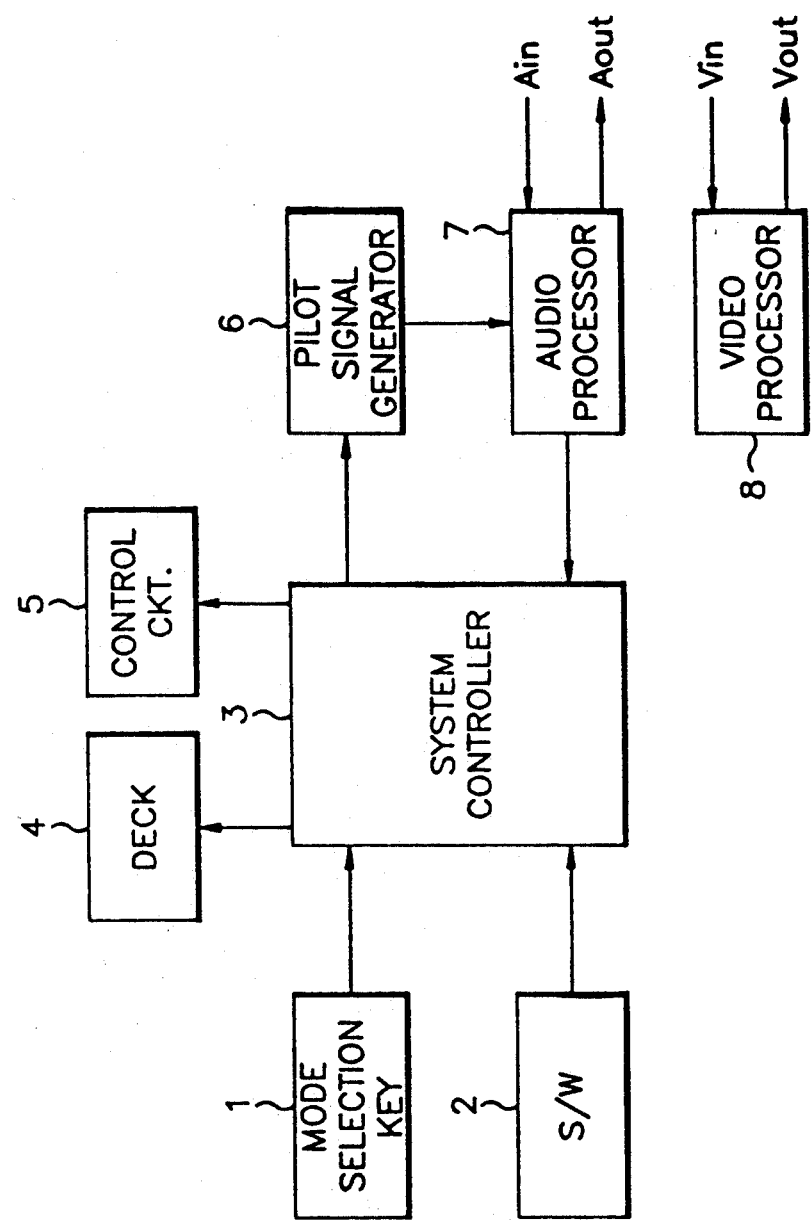
FIG. 1 is a block diagram of a preferred embodiment of the inventive apparatus.

Referring to FIG. 1, a mode selection means 1 generates signals for operating a video tape recorder in playback and record modes. A system controller 3 controls a deck 4 and control circuit 5 in response to the signals generated by the mode selection means 1 and a synchronous record switch 2.

If the record switch (not shown) of the mode selection means 1 is turned on together with the synchronous record switch 2, the system controller 3 causes an empty video to be loaded into the deck 4 in a pause mode. Thereafter the system controller 3 provides a control signal to a pilot signal generating means 6 to generate a pilot signal having a given pilot signal frequency applied through an audio processing means 7 to an audio line output terminal $A_{out}$, which pilot signal is in turn applied to an audio line input terminal of another video tape recorder (not shown).

Thereafter, the pilot signal is fed back from the other video tape recorder to an audio line input terminal $A_{in}$, and detected by the audio processing means 7 and transmitted to the system controller 3. Then the system controller 3 changes the operational mode of the deck 4 from the pause mode to record mode. Thus a normal record function is performed. Meanwhile, the video processing means 8 processes a video signal of the other video tape recorder received at a video line input terminal $V_{in}$. The processed video signal is transmitted from a video line output terminal $V_{out}$ to a record head to record the processed video signal in an empty video tape (not shown).

Alternatively, assuming the apparatus of FIG. 1 is a video tape recorder for playing back a recorded video tape, if a playback switch of the mode selection means 1 is turned on together with the synchronous record switch 2, the system controller 3 controls the control circuit 5 to cause the recorded video tape to be loaded in the deck 4 in the pause mode. Thereafter, if a pilot signal is inputted through the audio line input terminal $A_{in}$, the system controller 3 changes the operational mode of the deck 4 from the pause mode to the playback mode. Meanwhile, the video processing means 8 processes video tape signals read by the playback head (not shown). The processed video tape signals are transmitted through the video line output terminal $V_{out}$ to another video tape recorder (not shown) in the record mode.

Figure 2:
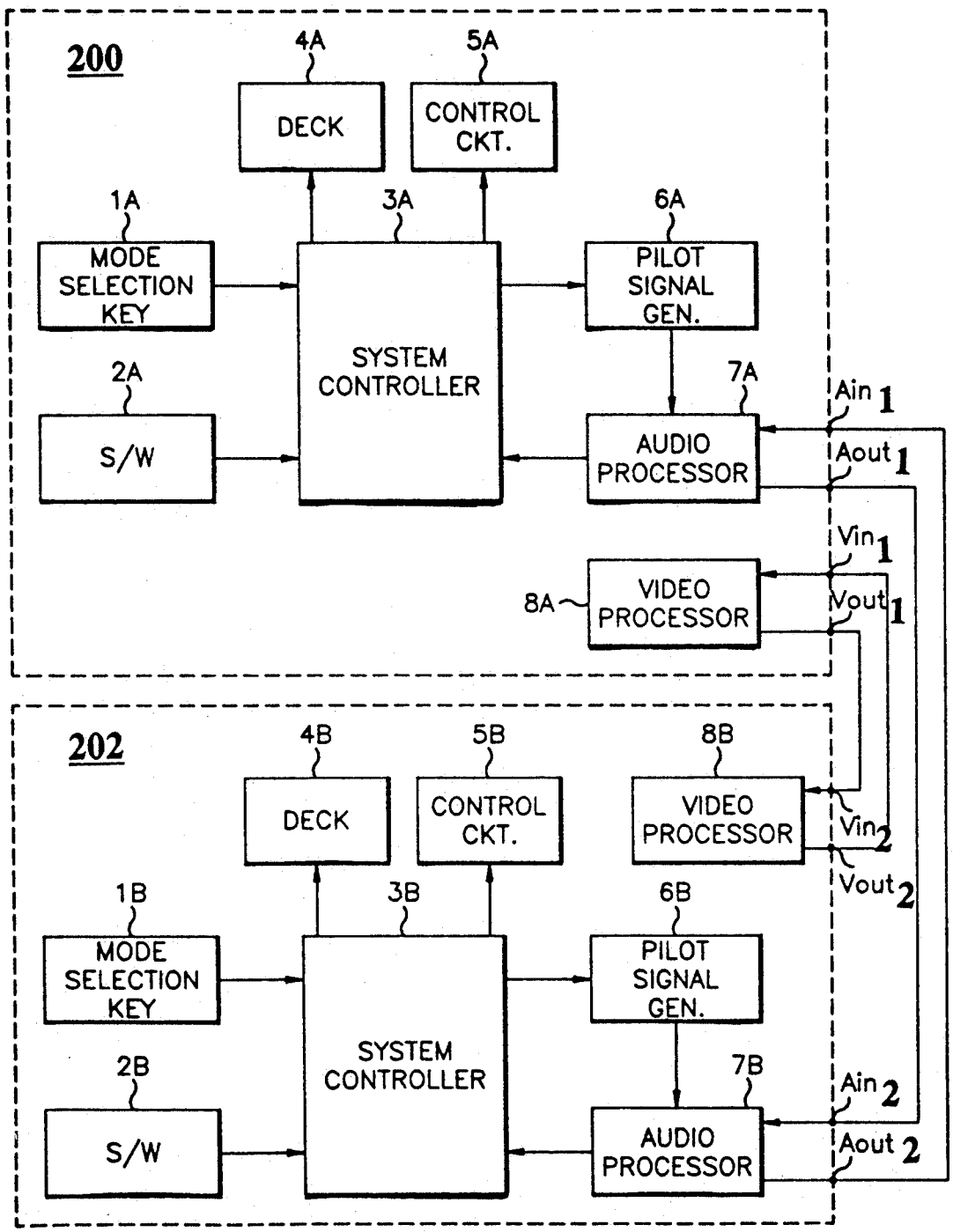
FIG. 2 is a block diagram of two inventive apparatuses of FIG. 1 being connected to perform simultaneous dubbing.

Referring to FIG. 2, a first video tape recorder 200 is operated in the playback mode, and a second video tape recorder 202 is operated in the record mode.

The audio line input and output terminals $A_{in1}$ and $A_{out1}$ of the first video tape recorder 200 are connected to the audio line output and input terminals $A_{out2}$ and $A_{in2}$ of the second video tape recorder 202. Also the video line output terminal $V_{out1}$ of the first video tape recorder 200 is connected to the video line input terminal $V_{in2}$ of the second video tape recorder 202.

In operation, if the synchronous record switches 2A and 2B of the first and second video tape recorders 200, 202 are turned on, the system controllers 3A and 3B recognize the synchronous record mode being presently performed. Then if the playback key of the mode selection means 1A is activated, system controller 3A controls a control circuit 5A to load a recorded video tape (not shown) to play back in deck 4A, and then to stop rotation of a capstan (not shown) of the first video tape recorder 200. Thus the system controller 3A causes the first video tape recorder 200 to be in the pause mode until receiving a second pilot signal from the audio signal processing means 7A.

Meanwhile, if a record key of the mode selection means 1B of the second video tape recorder 202 is activated, system controller 3B controls a control circuit 5B to load an empty video tape (not shown) in deck 4B, and then to stop rotation of a capstan (not shown) of the second video tape recorder 202, with deck 4B in the pause mode. In addition, the system controller 3B provides a first control signal to a pilot signal generating means 6B to generate a first pilot signal applied through an audio processing means 7B to an audio line output terminal $A_{out2}$ to an audio line input terminal $A_{in1}$ of the first video tape recorder.

The first pilot signal is applied through the audio processing means 7A to the system controller 3A to change the operational mode of the first video tape recorder from the pause mode to the playback mode.

The system controller 3A of the first video tape recorder 200 provides a second control signal to the pilot signal generating means 6A to generate a second pilot signal applied to the audio processing means 7A. The audio processing means 7A adds the second pilot signal with audio signals of the recorded video tape generated from an audio head. The combined signal is applied through the audio output terminal $A_{out1}$ of the first video tape recorder 200 to the audio input terminal $A_{in2}$ of the second video tape recorder 202 to the audio processing means 7B. The audio processing means 7B detects the second pilot signal applied to the system controller 3B of the second video tape recorder 202. Then the system controller 3B controls the control circuit 5B to change the operational mode of the deck 4B from the pause mode to the record mode.

Thus the second video tape recorder 202 performs the recording function simultaneously with the playing back of the first video tape recorder 200 from the initiation of the playing back mode, i.e., for the complete playback.

Figure 3:
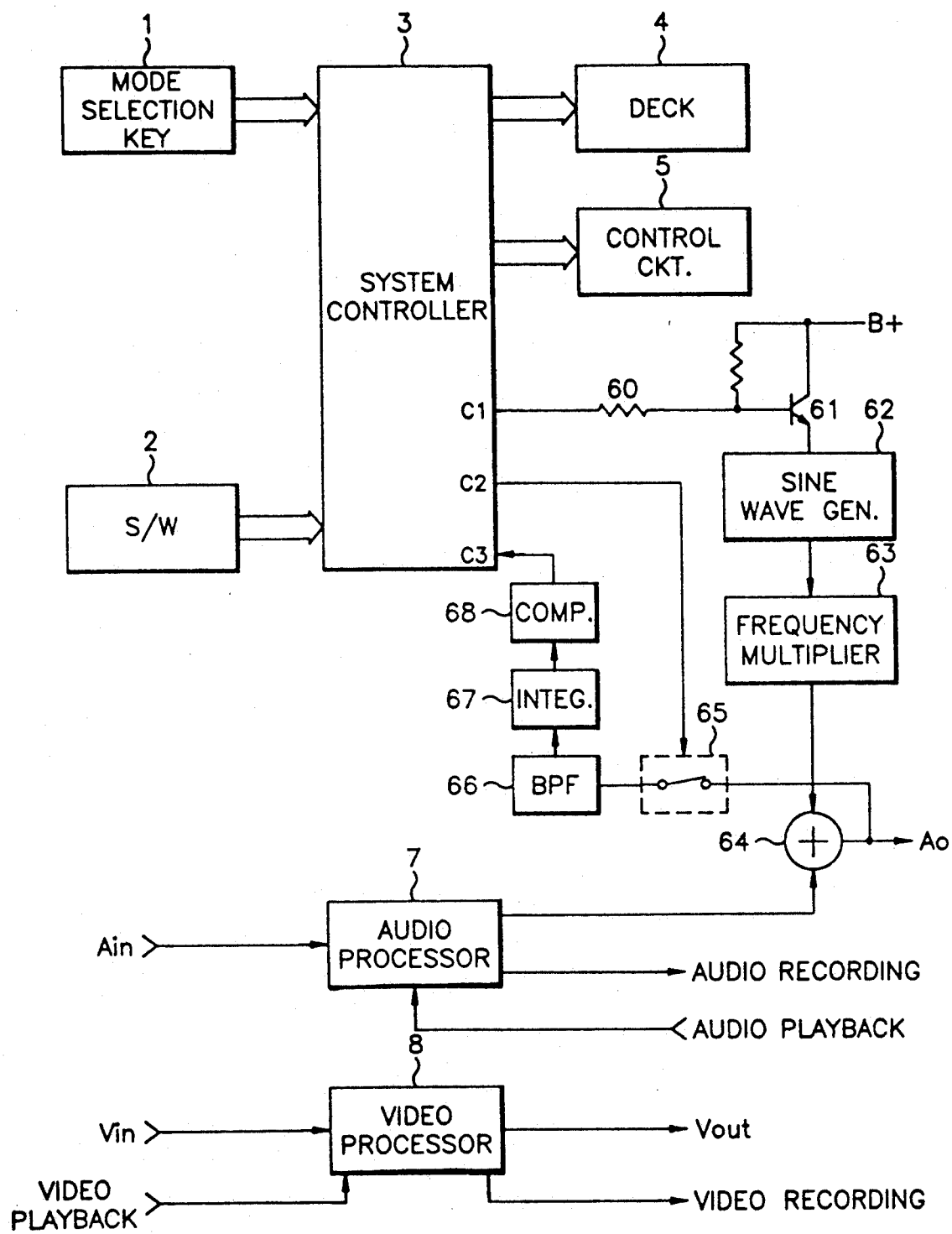
FIG. 3 is a detailed block diagram of the structure of FIG. 1.

Now reference is made to FIG. 3 for details of the apparatus of FIG. 1.

Assuming the apparatus of FIG. 3 is in the record mode, the system controller 3 generates a control signal of high logic state applied through a first control terminal C1 to a resistor 60 connected to a base of a transistor 61. The transistor 61 is then turned on to enable a sine wave signal generator 62 by supplying a voltage B+.

The sine wave signal generator 62 provides a signal of a suitable oscillation frequency (e.g., 1 KHz–3 KHz) to a frequency multiplier 63. A frequency multiplied signal of the frequency multiplier 63 is applied to an adder 64. In this case, it is desired that the frequency-multiplied signal has an inaudible frequency so as not to interfere with an audio signal generated from the audio processing means 7, thus preventing the multiplied frequency from being recorded on the video tape by the audio head. The frequency-multiplied signal is transmitted through the adder 64 to an audio line output terminal $A_o$ and to the audio line input terminal of another video tape recorder (not shown).

Meanwhile, if another frequency-multiplied signal of an external source is inputted through an audio line input terminal $A_{in}$, the audio processing means 7 provides the played back audio signal together with the frequency-multiplied signal (pilot signal) through the adder 64 to the audio line out terminal $A_o$ to a monitor. In addition, the output of the adder 64 is transmitted through an analog switch 65 controlled by a signal from a second control terminal C2 of the system controller 3 to a band pass filter 66. The second control terminal C2 of the system controller 3 detects the pilot signal after completion of tape loading.

The band pass filter 66 detects the pilot signal from the combined signal of the audio signal and pilot signal received through the analog switch 65, which pilot signal is applied to an integrating circuit 67. The integrating circuit 67 integrates the pilot signal into a direct current signal applied to a comparator 68, which compares the integrated direct current signal with a given reference signal to detect the pilot signal. If the pilot signal is detected, the comparator 68 generates a signal of high logic state to the system controller 3 at a control terminal C3. Then the system controller 3 changes the operational mode of the deck 4 from the pause mode to the record mode.

Alternatively, if the video tape recorder of FIG. 3 is to serve the playback mode, the system controller 3, after performing the pause mode, turns on the analog switch 65 to receive the pilot signal from the audio line input terminal $A_{in}$ through the audio processing means 7 and the mixer 64. Then, the bandpass filter 66 detects the pilot signal which is applied to the integrating circuit 67, which integrates the pilot signal into a direct current signal applied to the comparator 68 for providing a signal of high logic state to the system controller 3. Thus the system controller 3 changes the operational mode of the deck 4 from the pause mode to the normal playback mode. Meanwhile, the video processing means 8 processes the recorded signal of a video tape which was retrieved by the video playback head. The processed signal is supplied through the video line output terminal $V_{out}$ to the other video tape recorder serving the record mode, while the audio signal retrieved by an audio playback head is supplied through the audio line output terminal $A_o$ to the other video tape recorder. Thus the simultaneous dubbing is performed.

Figure 4:
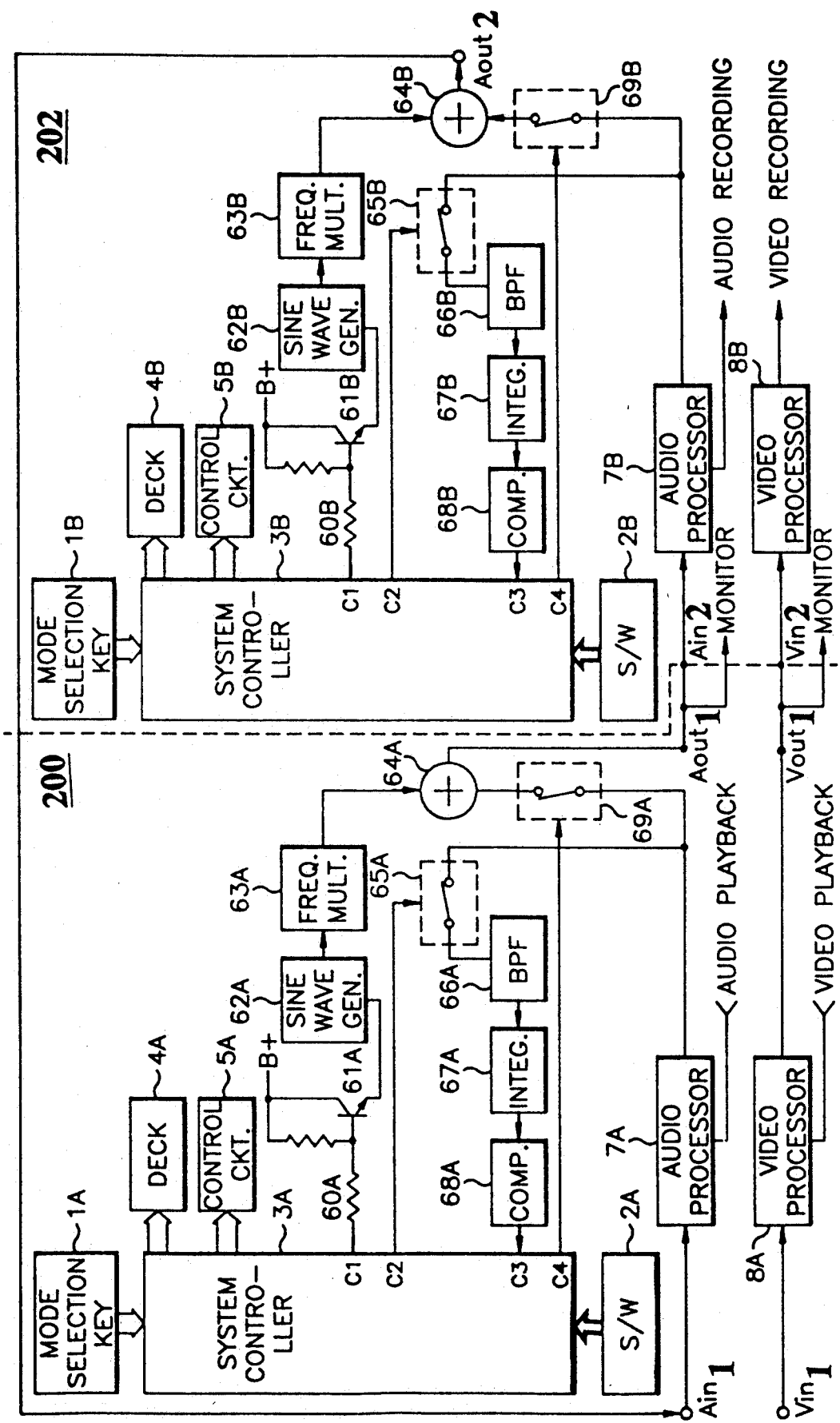
FIG. 4 is a detailed block diagram of FIG. 3.

Referring to FIG. 4 for more specifically illustrating two inventive apparatuses of FIG. 3 connected similar to FIG. 2, a first video tape recorder 200 for serving the playback mode and a second video tape recorder 202 for serving the record mode are interconnected. The audio and video line input/output terminals are connected as in FIG. 2.

In operation, when the synchronous record switches 2A and 2B of the first and second video tape recorders are activated, the system controllers 3A and 3B recognize the simultaneous dubbing mode.

The playback key of the first video tape recorder 200 is activated to cause the system controller 3A to control the control circuit 5A to load a recorded video tape into the deck 4A, and thereafter to stop the rotation of the capstan, causing the first video tape recorder 200 to be in the pause mode.

Meanwhile, the record key of the mode selection means 1B of the second video tape recorder is activated to cause the system controller 3B to control the control circuit 5B to load an empty video tape into the deck 4B, and thereafter to place the second video tape recorder in the pause mode. The system controller 3B also turns on a transistor 61B through a resistor 60B. Then the sine wave signal generator 62B applies a sine wave signal to the frequency multiplier 63B. The frequency-multiplied signal is applied through the adder 64B to the audio line output terminal $A_{out2}$ of the second video tape recorder 202, then to the audio line input terminal $A_{in1}$ of the first video tape recorder 200, and to the audio processing means 7A.

The audio processing means 7A applies the frequency-multiplied signal, i.e., the pilot signal received from the second video tape recorder 202 to the mixer 64A. The pilot signal is detected by the band pass filer 66A then applied to the integrating circuit 67A, since the analog switch 65A is turned on by the system controller 3A after completion of tape loading of the first video tape recorder 200. The integrating circuit 67A integrates the detected signal into a direct current signal applied to the comparator 68A, which in turn applies the pilot signal to the system controller 3A. Thus, the system controller 3A recognizes the pilot signal of a high logic state to cause the control circuit 5A to change the operational mode of deck 4A from the pause mode to the playback mode.

Consequently, the audio signal and the pilot signal retrieved by the audio playback head is processed by the audio processing means 7A and applied through the audio line output terminal $A_{out1}$ to the audio line input terminal $A_{in2}$ of the second video tape recorder 202 and to the audio processing means 7B.

The audio and pilot signals of the audio processing means 7B are applied through an analog switch 65B to the band pass filter 66B, which detects the pilot signal and applies it to the integrating circuit 67B. Then the integrating circuit 67B integrates the pilot signal which is applied to the comparator 68B, which in turn provides a signal of a high logic state to the system controller 3B. The system controller 3B changes the operational mode of the deck 4B to the record mode. Thus the recording function of the second video tape recorder 202 is performed from the initiation of the playback function of the first video tape recorder 200. The audio and video playback signals of the first video tape recorder 200 are retrieved by the audio and video playback heads and applied to the monitor, and recorded in the empty vide tape by the audio and video record heads of the second video tape recorder 202.

Figure 5:
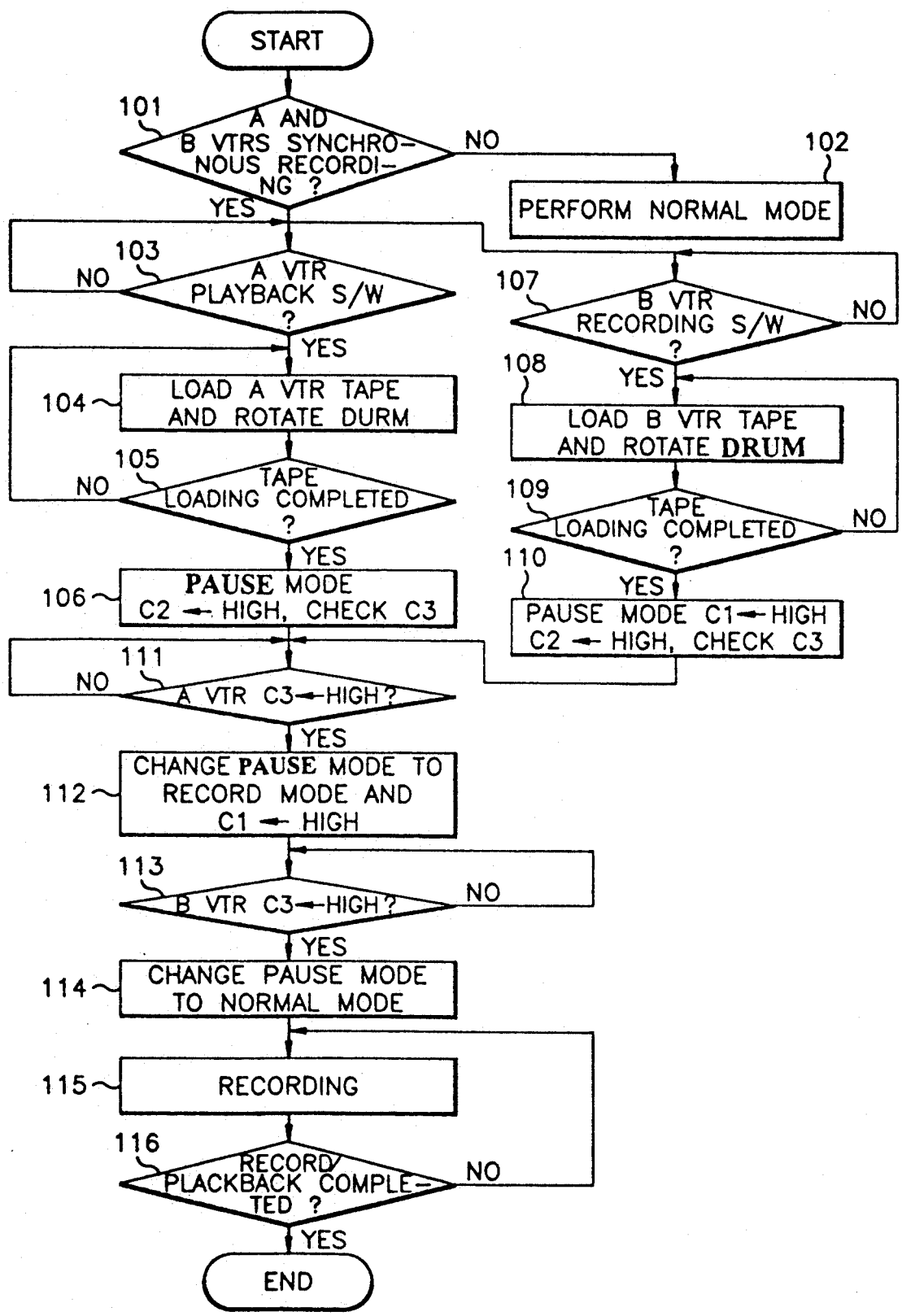
FIG. 5 is a flow chart of the steps of a preferred embodiment of the inventive method for performing the simultaneous dubbing.

FIG. 5 if a flow chart of a preferred embodiment of the method of simultaneous dubbing according to the present invention. The system controllers 3A and 3B determine whether the synchronous record switches 200, 202 are activated in step 101. If both of the synchronous record switches 2A and 2B are not activated, the method proceeds to step 102 for normal operation.

If both synchronous record switches 2A and 2B are activated, the method proceeds to step 103 with the playback key of the first video tape recorder being activated before the record key of the second video tape recorder.

The system controller 3A loads the recorded video tape into the deck 4A in step 104, and provides the first video tape recorder 200 in the pause mode after completion of the loading. Further, the system controller 3A turns on the analog switch 65A by the control signal from control terminal C2 of a high logic state, and determines a control signal of control terminal C3 in step 106.

Meanwhile, if the record switch of the second video tape recorder is activated, the method proceeds from step 107 to step 108, so that the system controller 3B of the second video tape recorder 202 loads an empty video tape, and determines whether the loading is completed in step 109. If the loading is completed, the system controller 3B provides the second video tape recorder 202 in the pause mode, and generates the pilot signal by providing a logic high control signal at control terminal C1. The pilot signal is supplied to the first video tape recorder 200. The system controller 3B supplies a logic high control signal at control terminal C2 to turn on the analog switch 65B. The system controller 3B also checks the state of the control signal at control terminal C3.

If the pilot signal generated from the second video tape recorder 202 is applied to the first video tape recorder 200, the system controller 3A determines in step 111 whether the control signal at control terminal C3 is high, indicating the existence of the pilot signal. The system controller 3A then changes the operational mode of the first video tape recorder 200 from the pause mode to the record mode, while providing the control signal of control terminal C1 as high to generate the pilot signal applied to the second video tape recorder 202 in step 212.

The system controller 3B then determines whether the control signal at control terminal C3 is high, thus determining the existence of the pilot signal. If the control signal of the control terminal C3 is high in step 113, the method proceeds to step 114, and the system controller 3B changes the operational mode of the second video tape recorder 202 from the pause mode to the normal record mode in step 115. Finally, the record/playback function of the first and second video tape recorders is completed in step 116.

As stated above, the present invention employs a pilot signal in order to dub a recorded video tape from initiation of the playback mode by using two video tape recorders.

Although the present invention is described with reference to the attached drawings, it is not limited thereby, and various modifications may be made without departing from the scope of the invention. For example, the inventive apparatus may be embodied in the form of an external adapter rather than an internal unit of the video tape recorder.

What is claimed is:

1. In a video tape recorder comprising a mode selection means for generating a plurality of key signals to perform various modes including record, pause and playback modes, and dual deck means comprising a first deck and a second deck for playing back and recording video tapes in response to said plurality of key signals, an apparatus for dubbing a recorded video tape simultaneously with the playing back of the recorded video tape from initiation of said playback mode, said apparatus comprising:

synchronous record switch means for generating a synchronous record signal to enable said video tape recorder to dub said recorded video tape in synchronism with the playback mode;

control means for generating first and second control signals, said first control signal driving said dual deck means to load an empty video tape in the first deck and thereafter to pause said video tape recorder when a record key signal is inputted together with said synchronous record signal, said second control signal driving said dual deck means to load the recorded video tape in the second deck and thereafter to provide said video tape recorder in pause mode when a playback key signal is inputted together with said synchronous record signal;

pilot signal generating means for generating a pilot signal of a pilot signal frequency in response to one of said first and second control signals;

adding means for adding said pilot signal and an audio signal generated from said recorded video tape being played back; and pilot signal detection means for detecting said pilot signal from the added signal and releasing said first deck and said second deck of said video tape recorder from said pause mode in response to said detected pilot signal.

2. The apparatus for dubbing a recorded video tape simultaneously with the playing back of said recorded video tape as in claim 1, wherein said pilot signal generating means generates said pilot signal consisting of an inaudible frequency.

3. The apparatus of claim 1 wherein said pilot signal detection means comprises: a bandpass filter passing said pilot signal of the added signal;

an integrating circuit providing a direct current signal by integrating said filtered pilot signal; and a comparator providing a comparator signal to the control means by comparing the direct current signal with a reference signal, said comparator signal indicating detection of said pilot signal.

4. A method for dubbing a recorded video tape simultaneously with playing back of said recorded video tape by using first and second video tape recorders each comprising mode selection key means for generating a plurality of key signals comprising a record key signal, a pause key signal and a play key signal to perform record, pause and playback modes, and deck means for playing back and recording video tapes in response to said plurality of key signals, the method comprising the steps of:

operating said first video tape recorder in the pause mode after loading the recorded video tape when said first video tape recorder receives a playback key signal together with a synchronous record signal;

operating said second video tape recorder in pause mode after loading an empty video tape when said second video tape recorder receives a record key signal together with said synchronous record signal;

providing a first pilot signal of a first pilot signal frequency in said second video tape recorder, for indicating said second video tape recorder is ready to enter the record mode;

generating a second pilot signal having a second pilot signal frequency in said first video tape recorder;

changing said first video tape recorder from said pause mode into said playback mode in response to the first pilot signal received from said second video tape recorder;

mixing said second pilot signal with an audio signal from said recorded video tape being played back;

detecting said second pilot signal from said mixed signal in the second video tape recorder; and changing said second video tape recorder from said pause mode to said record mode in response to said detected second pilot signal, said step of changing said second video tape recorder providing a moment of starting the playback mode of said first video tape recorder being simultaneous with a moment of starting the record mode of said second video tape recorder.

5. The method for dubbing a recorded video tape simultaneously with the playing back of said recorded video tape as claimed in claim 4, wherein said providing step provides said first pilot signal consisting of an inaudible frequency.

6. The method for dubbing a recorded video tape simultaneously with the playing back of said recorded video tape as claimed in claim 4, wherein said providing step provides said first pilot signal to an audio terminal of said second video tape recorder and said generating step provides said second pilot signal to an audio terminal of said first video tape recorder.

7. The method for dubbing a recorded video tape simultaneously with the playing back of said recorded video tape as claimed in claim 4, wherein said step of generating said second pilot signal further comprises generating said second pilot signal consisting of an inaudible frequency.

8. An apparatus for copying a first video tape to a second video tape, said apparatus comprising:
   synchronous recording switching means for generating a synchronous recording signal to initiate the first video tape in a play mode in a first VTR section while synchronously initiating the second video tape in a record mode in a second VTR section;
   control means for generating in dependence upon the synchronous recording signal a first control signal for driving a first deck to load the first video tape and for causing the first deck to enter a pause mode, and a second control signal for driving a second deck to load the second video tape and for causing the second deck to enter a pause mode;
   pilot signal generating means for generating a first pilot signal having a first pilot signal frequency in dependence upon the first control signal, and a second pilot signal having a second pilot signal frequency in dependence upon the second control signal
   adding means for providing an added signal by adding said first pilot signal with an audio signal of said first video tape in the play mode; and
   pilot signal detection means for detecting said first pilot signal from said added signal, said control means synchronously changing the first deck to the play mode in response to the detected first pilot signal and changing the second deck to the record mode in response to the second pilot signal.

9. The apparatus of claim 8, wherein said pilot signal generating means generates said first pilot signal consisting of an inaudible frequency.

10. The apparatus of claim 8 wherein said pilot signal detection means comprises:
    a band pass filter passing one of the first and second pilot signals;
    an integrating circuit providing a direct current signal by integrating said one filtered signal; and
    a comparator providing a comparator signal to the control means by comparing said integrated signal with a reference signal, said comparator signal indicating detection of said one of the first and second pilot signals.

11. The apparatus of claim 8, wherein said pilot signal generating means generates said second pilot signal consisting of an inaudible frequency.

12. The apparatus of claim 8, wherein said pilot signal generating means comprises:
    a switching circuit activating a sine wave generator in response to said comparator signal, said sine wave generator generating a sine wave signal; and
    a frequency multiplier providing one of said first and second pilot signals consisting of an inaudible frequency by frequency multiplying said sine wave signal.

13. A method for copying a first video tape to a second video tape, comprising the steps of:
    generating a synchronous recording signal to initiate the first video tape in a play mode in a first VTR section while synchronously initiating the second video tape in a record mode in a second VTR section;
    generating in dependence upon the synchronous recording signal, a first control signal for driving a first deck to load the first video tape and for causing the first deck to enter a pause mode, and a second control signal for driving a second deck to load the second video tape and for causing the second deck to enter a pause mode; and
    generating a first pilot signal having a first pilot signal frequency in dependence upon the first control signal, and a second pilot signal having a second pilot signal frequency in dependence upon the second control signal;
    adding said first pilot signal with an audio signal of the first video tape in the play mode;
    detecting said first pilot signal from said added signal; and
    synchronously changing the first deck to the play mode in response to the detected first pilot signal and changing the second deck to the record mode in response to the second pilot signal.

14. The method of claim 13, wherein said step of generating first and second pilot signals further comprises generating said first pilot signal consisting of an inaudible frequency.

15. The method of claim 13, wherein said step of generating said first and second pilot signals generates said second pilot signal consisting of an inaudible frequency.

* * * * *

UNITED STATES PATENT AND TRADEMARK OFFICE
CERTIFICATE OF CORRECTION

PATENT NO. : 5,249,084
DATED : 28 September 1993
INVENTOR(S) : Kwon-Pyo Hong

It is certified that error appears in the above-indentified patent and that said Letters Patent is hereby corrected as shown below:

Column 7,

Line 16,     change "step 212" to --step 112--.

Signed and Sealed this

Sixteenth Day of August, 1994

Attest:

BRUCE LEHMAN

Attesting Officer      Commissioner of Patents and Trademarks